(12) United States Patent
Hsieh et al.

(10) Patent No.: US 10,338,355 B2
(45) Date of Patent: Jul. 2, 2019

(54) LENS ASSEMBLY

(71) Applicant: LARGAN PRECISION CO., LTD., Taichung (TW)

(72) Inventors: Tung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 287 days.

(21) Appl. No.: 15/164,902

(22) Filed: May 26, 2016

(65) Prior Publication Data

US 2017/0227742 A1 Aug. 10, 2017

Related U.S. Application Data

(60) Provisional application No. 62/291,538, filed on Feb. 5, 2016.

(51) Int. Cl.
*G02B 13/14* (2006.01)
*G02B 27/02* (2006.01)
*G02B 27/00* (2006.01)

(52) U.S. Cl.
CPC ......... *G02B 13/14* (2013.01); *G02B 27/0006* (2013.01); *G02B 27/027* (2013.01)

(58) Field of Classification Search
CPC ... G02B 9/06; G02B 9/12; G02B 9/16; G02B 9/34; G02B 9/58; G02B 9/60; G02B 9/62; G02B 13/0035; G02B 13/004; G02B 13/0045; G02B 15/17; G02B 15/26
USPC ....... 359/650, 657, 658, 659, 660, 661, 795, 359/780, 782, 791, 773
See application file for complete search history.

(56) References Cited

U.S. PATENT DOCUMENTS

| | | | | |
|---|---|---|---|---|
| 8,369,009 B2 * | 2/2013 | Lin | ......................... | G02B 5/223 359/355 |
| 2003/0002009 A1 * | 1/2003 | Shono | ....................... | G02C 9/04 351/47 |
| 2008/0192256 A1 * | 8/2008 | Wolf | ...................... | G01S 7/4813 356/445 |
| 2012/0212808 A1 * | 8/2012 | Watanabe | ................ | G02B 9/16 359/357 |
| 2014/0139698 A1 * | 5/2014 | Fukuta | ............... | H04N 5/23245 348/220.1 |
| 2015/0370039 A1 * | 12/2015 | Bone | .................... | G02B 13/004 359/715 |

* cited by examiner

*Primary Examiner* — Stephone B Allen
*Assistant Examiner* — Rahman Abdur
(74) *Attorney, Agent, or Firm* — CKC & Partners Co., LLC

(57) ABSTRACT

A lens assembly includes at least three lens elements. One lens element closest to an imaged object of the lens elements is a first lens element, which is made of an electromagnetic radiation absorbing material.

20 Claims, 12 Drawing Sheets

LENS ASSEMBLY

RELATED APPLICATIONS

The application claims priority to U.S. Provisional Application Ser. No. 62/291,538, filed Feb. 5, 2016, which is herein incorporated by reference.

BACKGROUND

Technical Field

The present disclosure relates to a lens assembly. More particularly, the present disclosure relates to a compact lens assembly which is applicable to NIR (Near-Infrared) imaging.

Description of Related Art

In recent years, as portable electronic devices like smartphones become more widespread, the demands for better optics for a wider range of applications (such as better quality photographs, better security features . . . etc.) have also dramatically increased. It has become increasingly difficult to meet the increasing optical quality standards, especially for imaging of electromagnetic radiation with wavelengths in a range of 750 nm to 1100 nm (i.e. NIR radiation), and improvements are often gained at the cost of aesthetics. Also, as the lens assembly gets smaller in size, it becomes more difficult to reduce stray radiation, especially in NIR imaging, wherein both NIR and VIS (Visible) radiation become possible sources of interference with the image, thus novel ways of reducing such interferences are required.

One of the conventional technologies teaches a lens assembly for electromagnetic radiation with wavelengths in a working range of 750 nm to 2000 nm, wherein the technology incorporates a lens element absorbing electromagnetic radiation with wavelengths in a range of 350 nm to 700 nm (i.e. VIS radiation) and allowing NIR radiation to pass. While this improves NIR imaging capabilities of the lens assembly, it is insufficient to optimally keep stray radiation out, for example, some stray radiation can be reflected through the gaps between the lens elements and the housing.

The technology also teaches the lens assembly including a last lens element, which is the lens element closest to the image surface of the lens assembly, and has positive refractive power and a convex image-side surface. This arrangement is unsuited for reducing the overall size of the lens assembly, as the positive refractive power and the convex image-side surface cause a principle point of the lens assembly to be too close to the image surface to reduce the back focal length, which hinders miniaturization.

In addition, the lens assembly including housing itself may not look aesthetically pleasing. Aesthetics is important aspect as the lens element of NIR imaging is often pointed towards the users, thus the lens element of NIR imaging is more visible than the lens element of typical rear facing VIS imaging during normal usage.

Given the above, the conventional lens assemblies of NIR imaging cannot satisfy the requirements of compact size, reducing stray radiation, enhancing image quality and improving aesthetics, so there is an urgent need in developing a lens assembly of NIR imaging with the features of compact size, reducing stray radiation, enhancing image quality and improving aesthetics.

SUMMARY

According to one aspect of the present disclosure, a lens assembly includes at least three lens elements, wherein one lens element closest to an imaged object of the lens elements is a first lens element, which is made of an electromagnetic radiation absorbing material. When an average transmittance of the electromagnetic radiation absorbing material for electromagnetic radiation with wavelengths in a range of 750 nm to 1100 nm is T_750, and an average transmittance of the electromagnetic radiation absorbing material for electromagnetic radiation with wavelengths in a range of 350 nm to 700 nm is T_700, the following conditions are satisfied:

$50\% < T\_750$; and $T\_700 < 20\%$.

According to another aspect of the present disclosure, a lens assembly includes at least three lens elements, wherein one lens element closest to an image surface of the lens elements is a last lens element. The last lens element has an image-side surface being concave in a paraxial region thereof, and the image-side surface of the last lens element is aspheric and includes at least one convex shape in an off-axial region thereof. At least one of the lens elements is made of an electromagnetic radiation absorbing material. When an average transmittance of the electromagnetic radiation absorbing material for electromagnetic radiation with wavelengths in a range of 750 nm to 1100 nm is T_750, and an average transmittance of the electromagnetic radiation absorbing material for electromagnetic radiation with wavelengths in a range of 350 nm to 700 nm is T_700, the following conditions are satisfied:

$50\% < T\_750$; and $T\_700 < 20\%$.

DETAILED DESCRIPTION

Figure 1:
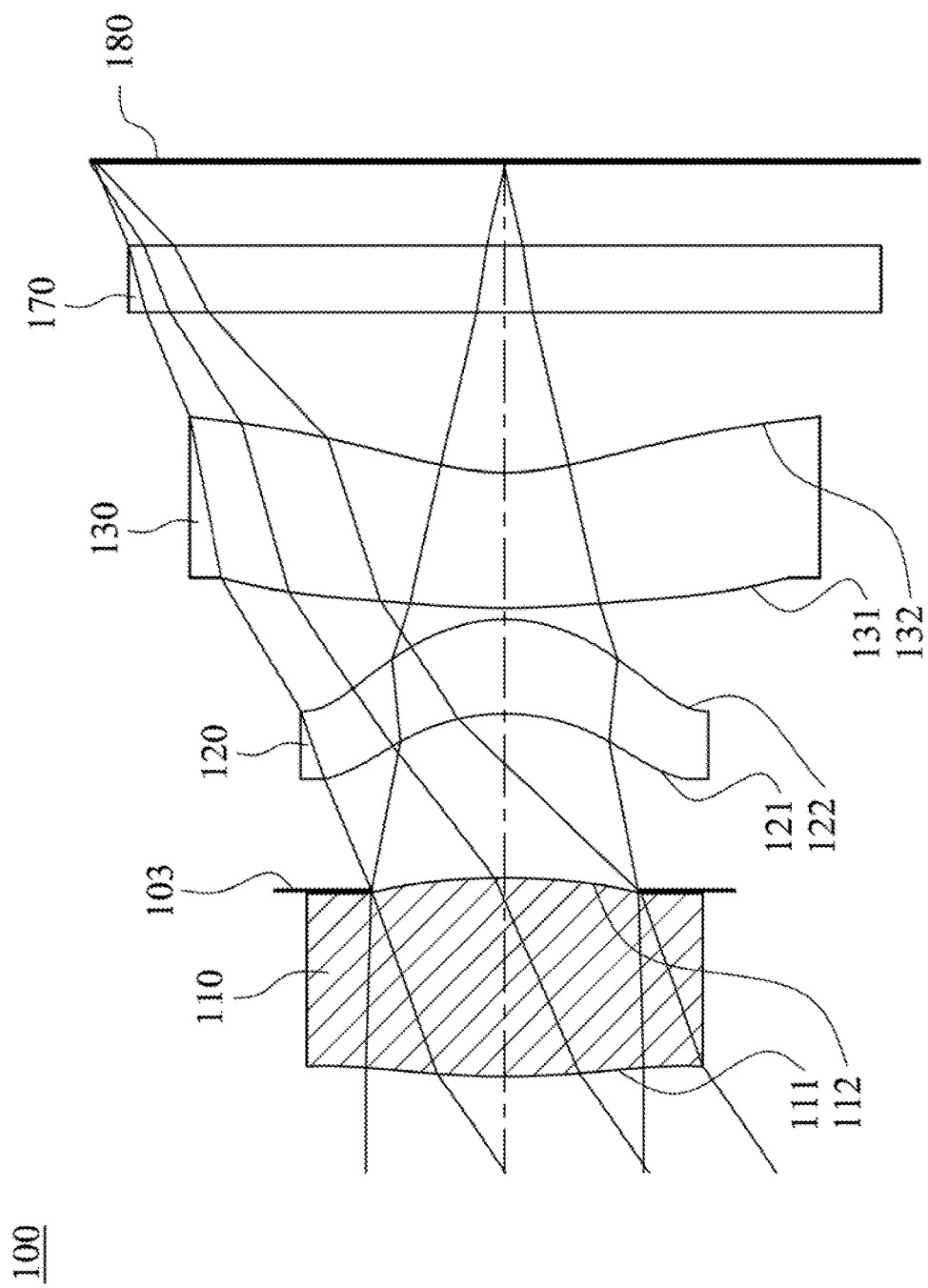
FIG. 1 is a schematic view of a lens assembly according to the 1st embodiment of the present disclosure.

A lens assembly includes at least three lens elements, wherein at least one of the lens elements is made of an electromagnetic radiation absorbing material.

When an average transmittance of the electromagnetic radiation absorbing material for electromagnetic radiation with wavelengths in a range of 750 nm to 1100 nm is T_750, the following condition is satisfied: 50%<T_750. Therefore, it is favorable for NIR imaging of the lens assembly, so that the intensity of NIR radiation falling on an image sensor is high enough to detect. Preferably, the following condition is satisfied: 70%<T_750.

When an average transmittance of the electromagnetic radiation absorbing material for electromagnetic radiation with wavelengths in a range of 350 nm to 700 nm is T_700, the following condition is satisfied: T_700<20%. Therefore, it is favorable for reducing unwanted VIS radiation and improving the image brightness of the lens assembly. Preferably, the following condition is satisfied: T_700<10%.

The electromagnetic radiation absorbing material can be made of a black dyed polycarbonate polymer. Therefore, it is favorable for absorbing VIS radiation with wavelengths below 700 nm into the lens assembly.

One lens element closest to an imaged object of the lens elements is a first lens element, which can be made of the electromagnetic radiation absorbing material. Therefore, the unwanted stray VIS radiation can be blocked out, and prevented from bouncing inside the lens assembly and onto an image surface, so that NIR imaging is dramatically improved.

The first lens element can have positive refractive power. Therefore, it is favorable for providing refractive power and focusing for the lens assembly, and maintaining the compact size.

The lens element made of the electromagnetic radiation absorbing material of the present disclosure is neither limited to the first lens element, nor limited to one of the lens elements. That is, a second lens element, a third lens element . . . etc. in order from an object side to an image side of the lens assembly can be made of the electromagnetic radiation absorbing material, and two, three or more of the lens elements of the lens assembly can be made of the electromagnetic radiation absorbing material. Therefore, it is allowed that the lens assembly of NIR imaging can be used in a wider range of portable electronics, unlike the conventional lens assemblies with excessive length (over 10 mm in total track length) which are used as such.

Furthermore, multiple lens elements made of the electromagnetic radiation absorbing materials, which can be made of VIS radiation absorbing materials, can be configured, so that the VIS radiation absorbing of the lens assembly can be further improved while maintaining the sufficient image brightness.

One lens element closest to the image surface of the lens elements is a last lens element, wherein the last lens element can have negative refractive power. Therefore, it is favorable for reducing the back focal length of the lens assembly. The last lens element can have an image-side surface being concave in a paraxial region thereof. Therefore, it is favorable for effectively reducing the total track length of the lens assembly by the principle plane being moved towards the imaged object, so that the overall size is reduced, and the lens assembly is suitable for incorporation into a portable electronic device. The image-side surface of the last lens element can include at least one convex shape in an off-axial region thereof. Therefore, it is favorable for correcting aberrations.

When a number of the lens elements of the lens assembly is N, the following condition can be satisfied: $3 \leq N \leq 7$. Therefore, it is favorable for obtaining a suitable balance between miniaturization of the lens assembly and achieving satisfactory image quality. Preferably, the following condition can be satisfied: $4 \leq N \leq 6$.

The lens elements can be all made of plastic materials. Plastic materials are suitable for molding of the lens elements, especially those with aspheric surfaces. Also plastic materials can be suitable for injection molding methods so as to allow greater flexibility in the surface shapes of the lens elements, as well as mass production. Furthermore, plastic materials are suitable for dyeing, particularly black color dyeing, and coating so as to allow greater flexibility in the arrangement of the lens element made of the electromagnetic radiation absorbing material.

When a refractive index of the electromagnetic radiation absorbing material is Nb, the following condition can be satisfied: 1.56<Nb<1.75. Therefore, it is favorable for reducing the effective diameter so as to decrease the overall size of the lens assembly.

When an Abbe number of the electromagnetic radiation absorbing material is Vd_b, the following condition can be satisfied: Vd_b<35. Therefore, it is favorable for obtaining a balance between astigmatism correction and resolution.

When an axial distance between an object-side surface of the first lens element and the image surface is TTL, the following condition can be satisfied: 1.0 mm<TTL<8.0 mm. Therefore, it is favorable for reducing the total track length so as to allow the lens assembly to take a form compact enough to be incorporated into a portable electronic device.

When a focal length of the lens assembly is f, the following condition can be satisfied: 0 mm<f<7.0 mm. Therefore, it is favorable for the lens assembly to take on a field of view sufficiently large so as to be useful for various applications.

When a maximum image height of the lens assembly is imgH, and an axial distance between the image-side surface of the last lens element and the image surface is BL, the following condition can be satisfied: 1.0<ImgH/BL<6.0. Therefore, it is favorable for reducing the back focal length of the lens assembly so as to maintain the compact size.

When an f-number of the lens assembly is Fno, the following condition can be satisfied: $1.40 < Fno \leq 2.25$. Therefore, it is favorable for obtaining a balance between the overall brightness of the image and the depth of field resolution of the lens assembly so as to enhance the precision in NIR radiation detection.

The lens assembly can further include a housing made of a black dyed plastic material. Therefore, it is favorable for absorbing VIS radiation and reducing unwanted stray NIR radiation into the lens assembly. Furthermore, it is favorable for approaching a uniform and streamlined appearance of the lens assembly, wherein the entire front of the lens assembly is with a similar color so as to lead a better aesthetic appearance of the lens assembly to be installed in a portable electronic device.

Moreover, the housing can include an anti-VIS coating to further enhance the image quality of the lens assembly by reducing VIS radiation into the lens assembly. The housing can also include matte surfaces, wherein unwanted stray NIR radiation can be scattered by matte surfaces so as to reduce image ghosting.

The lens assembly can further include at least one electromagnetic radiation shield for blocking stray electromagnetic radiation. The electromagnetic radiation shield can be used as aperture stops or field stops to block stray NIR radiation reflected from the surfaces of the lens elements or the housing to fall on the image surface so as to further improve the imaging resolution of the lens assembly.

The lens assembly can be used in image recognitions, such as but not limited to, biometric authentications and eye trackers.

According to the lens assembly of the present disclosure, the lens elements thereof can be made of plastic or glass materials. When the lens elements are made of plastic materials, the manufacturing cost can be effectively reduced. When the lens elements are made of glass materials, the arrangement of the refractive power of the lens assembly may be more flexible to design. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the lens assembly can also be reduced.

According to the lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the lens assembly of the present disclosure, the refractive power or the focal length of a lens element being positive or negative may refer to the refractive power or the focal length in a paraxial region of the lens element.

According to the lens assembly of the present disclosure, the lens assembly can include at least one stop, such as an aperture stop, a glare stop or a field stop. The glare stop or the field stop is for eliminating the stray light and thereby improving the image resolution thereof.

According to the lens assembly of the present disclosure, the image surface, depending on the corresponding image sensor, can be a planar surface or a curved surface with any curvature, particularly a curved surface being concave toward the object side.

According to the lens assembly of the present disclosure, an aperture stop can be configured as a front stop or a middle stop. A front stop disposed between an imaged object and the first lens element can provide a longer distance between an exit pupil of the lens assembly and the image surface to enable a telecentric effect, and thereby can improve the image-sensing efficiency of an image sensor. A middle stop disposed between the first lens element and the image surface is favorable for enlarging the field of view of the lens assembly and thereby provides a wider field of view for the same.

According to the lens assembly of the present disclosure, the lens assembly can be optionally applied to moving focus optical systems. Furthermore, the lens assembly is featured with a good correction ability and high image quality, and can be applied to 3D (three-dimensional) image capturing applications, in products such as digital cameras, mobile devices, digital tablets, smart TVs, network surveillance devices, motion sensing input devices, driving recorders, rear view camera systems, extreme sports cameras, industrial robots, wearable devices and other electronic imaging products.

According to the above description of the present disclosure, the following 1st-6th specific embodiments are provided for further explanation.

1st Embodiment

Figure 2:
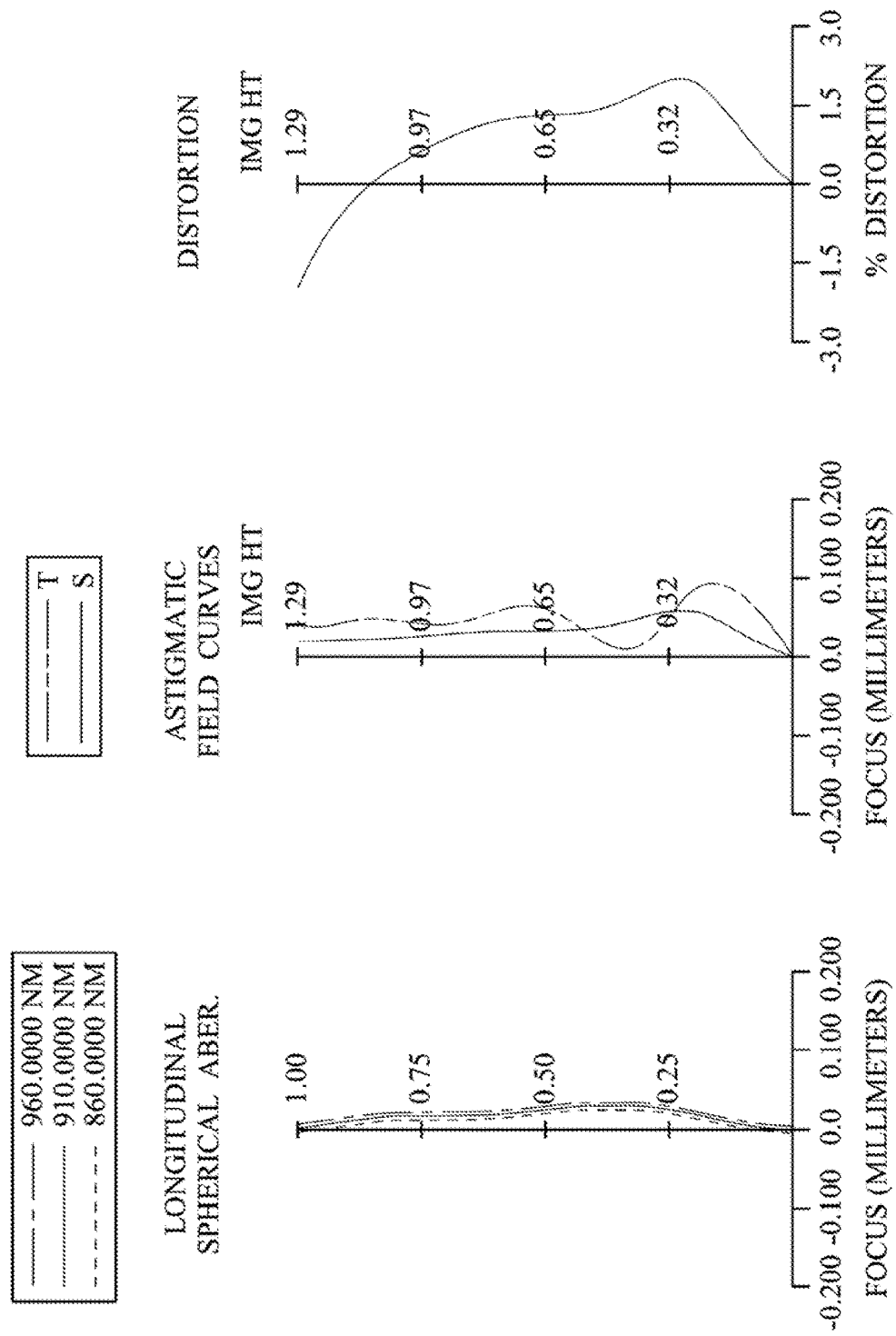
FIG. 2 shows spherical aberration curves, astigmatic field curves and a distortion curve of the lens assembly according to the 1st embodiment.

FIG. 1 is a schematic view of a lens assembly 100 according to the 1st embodiment of the present disclosure. FIG. 2 shows, in order from left to right, spherical aberration curves, astigmatic field curves and a distortion curve of the lens assembly 100 according to the 1st embodiment. In FIG. 1, the lens assembly 100 includes, in order from an object side to an image side, a first lens element 110, an aperture stop 103, a second lens element 120, a third lens element 130, a glass panel 170 and an image surface 180, wherein the third lens element 130 of the lens assembly 100 is the last lens element according to the 1st embodiment.

In the lens assembly 100 according to the 1st embodiment, when a number of the lens elements of the lens assembly 100 is N, the following condition is satisfied: N=3. That is, the lens assembly 100 has a total of three lens elements (110-130).

The first lens element 110 with positive refractive power has an object-side surface 111 being convex in a paraxial region thereof and an image-side surface 112 being convex in a paraxial region thereof. The first lens element 110 is made of a plastic material, which is an electromagnetic radiation absorbing material made of a black dyed polycarbonate polymer. The first lens element 110 has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 of the third lens element 130 includes at least one convex shape in an off-axial region thereof.

The glass panel 170 is made of a glass material and located between the third lens element 130 and the image surface 180. The glass panel 170 can be cover glass, filter or both above, and will not affect the focal length of the lens assembly 100.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the lens assembly 100 according to the 1st embodiment, when a focal length of the lens assembly 100 is f, an f-number of the lens assembly 100 is Fno, and half of a maximal field of view of the lens assembly 100 is HFOV, these parameters have the following values: f=1.87 mm; Fno=2.16; and HFOV=35.0 degrees.

In the lens assembly 100 according to the 1st embodiment, when an average transmittance of the electromagnetic radiation absorbing material of the first lens element 110 for electromagnetic radiation with wavelengths in a range of 750 nm to 1100 nm is T_750, the following condition is satisfied: T_750=95.40%.

In the lens assembly 100 according to the 1st embodiment, when an average transmittance of the electromagnetic radiation absorbing material of the first lens element 110 for electromagnetic radiation with wavelengths in a range of 350 nm to 700 nm is T_700, the following condition is satisfied: T_700=0.22%.

In the lens assembly 100 according to the 1st embodiment, when a maximum image height of the lens assembly 100 is ImgH (half of a diagonal length of an effective photosensitive area of an image sensor, not shown herein), and an axial distance between the image-side surface 132 of the last lens element (that is, the third lens element 130 according to the 1st embodiment) and the image surface 180 is BL, the following condition is satisfied: ImgH/BL=1.33.

In the lens assembly 100 according to the 1st embodiment, when a refractive index of the electromagnetic radiation absorbing material of the first lens element 110 is Nb, the following condition is satisfied: Nb=1.567.

In the lens assembly 100 according to the 1st embodiment, when an axial distance between the object-side surface 111 of the first lens element 110 and the image surface 180 is TTL, the following condition is satisfied: TTL=2.85 mm.

In the lens assembly 100 according to the 1st embodiment, when an Abbe number of the electromagnetic radiation absorbing material of the first lens element 110 is Vd_b, the following condition is satisfied: Vd_b=30.20.

The detailed optical data of the 1st embodiment are shown in TABLE 1 and the aspheric surface data are shown in TABLE 2 below.

TABLE 1

1st Embodiment
f = 1.87 mm, Fno = 2.16, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.601 | ASP | 0.620 | Plastic | 1.567 | 30.2 | 2.29 |
| 2 | | −2.379 | ASP | −0.039 | | | | |
| 3 | Ape. Stop | Plano | | 0.551 | | | | |
| 4 | Lens 2 | −0.644 | ASP | 0.296 | Plastic | 1.635 | 20.4 | 1.75 |
| 5 | | −0.480 | ASP | 0.035 | | | | |
| 6 | Lens 3 | 2.258 | ASP | 0.421 | Plastic | 1.635 | 20.4 | −2.04 |
| 7 | | 0.763 | ASP | 0.500 | | | | |
| 8 | Glass panel | Plano | | 0.210 | Glass | 1.509 | 64.2 | — |
| 9 | | Plano | | 0.261 | | | | |
| 10 | Image | Plano | | — | | | | |

Reference wavelength is 910 nm (d-line).
Lens 1 is made of an electromagnetic radiation absorbing material, which is a black dyed polycarbonate polymer.
Glass panel can be cover glass, filter or both above.

TABLE 2

Aspheric Coefficients

| Surface # | 1 | 2 | 4 |
|---|---|---|---|
| k = | −7.2356E+00 | 4.6070E+00 | −6.9800E+00 |
| A4 = | −1.8510E−01 | −4.9539E−01 | −2.6570E+00 |
| A6 = | −5.1506E−02 | 3.6995E+00 | 5.7899E+00 |
| A8 = | −5.6881E−01 | −2.1811E+01 | −3.3254E+01 |
| A10 = | 6.0148E−01 | 4.9523E+01 | 4.0216E+02 |
| A12 = | | | −1.3893E+03 |
| A14 = | | | 1.5030E+03 |

| Surface # | 5 | 6 | 7 |
|---|---|---|---|
| k = | −8.5532E+00 | −2.0716E+01 | −8.6803E+00 |
| A4 = | −6.1467E+00 | −6.7233E−01 | −2.5359E−01 |
| A6 = | 4.6923E+01 | 2.9635E+00 | 2.0425E−01 |
| A8 = | −2.5934E+02 | −7.5350E+00 | 3.1201E−01 |
| A10 = | 8.7140E+02 | 1.2806E+01 | −1.0616E+00 |
| A12 = | −1.4452E+03 | −1.3791E+01 | 1.1679E+00 |
| A14 = | 9.1666E+02 | 8.4612E+00 | −5.6373E−01 |
| A16 = | | −2.2556E+00 | 9.5664E−02 |

In TABLE 1, the curvature radius, the thickness and the focal length are shown in millimeters (mm). Surface numbers 0-10 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
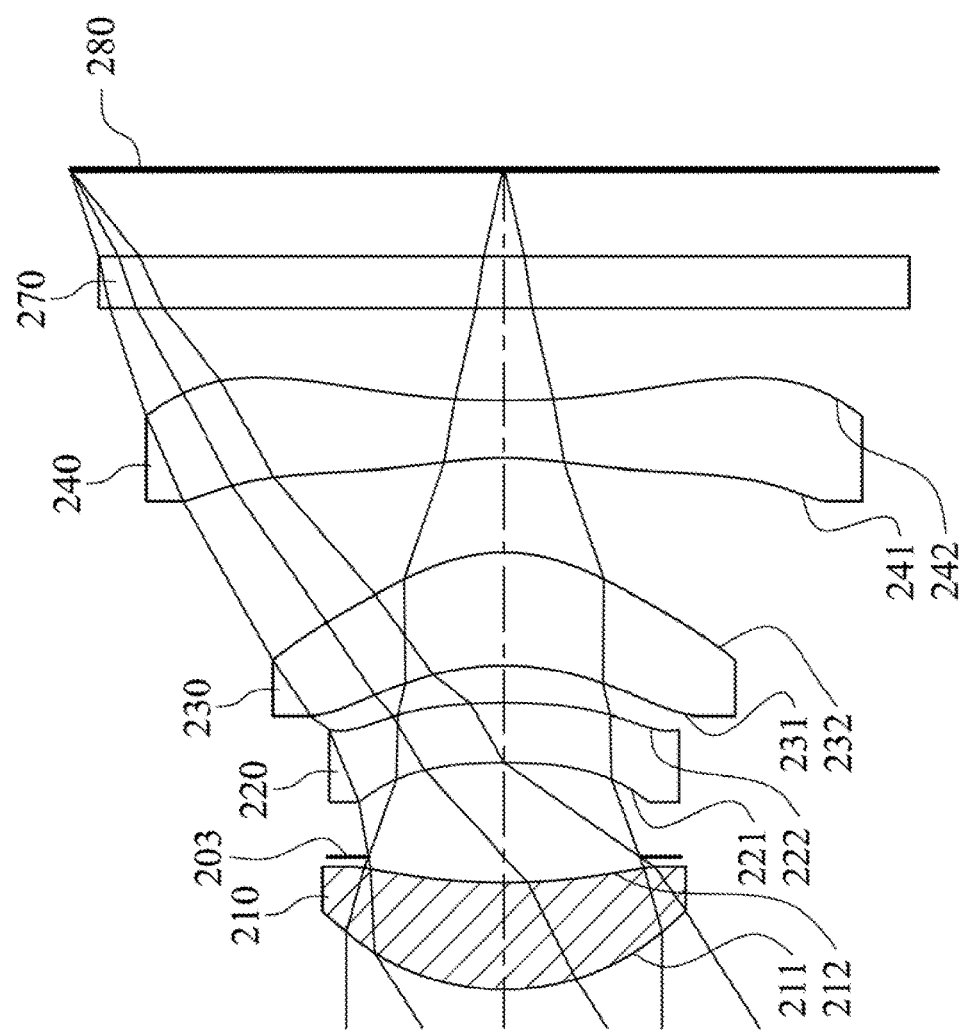
FIG. 3 is a schematic view of a lens assembly according to the 2nd embodiment of the present disclosure.

FIG. 3 is a schematic view of a lens assembly 200 according to the 2nd embodiment of the present disclosure.

Figure 4:
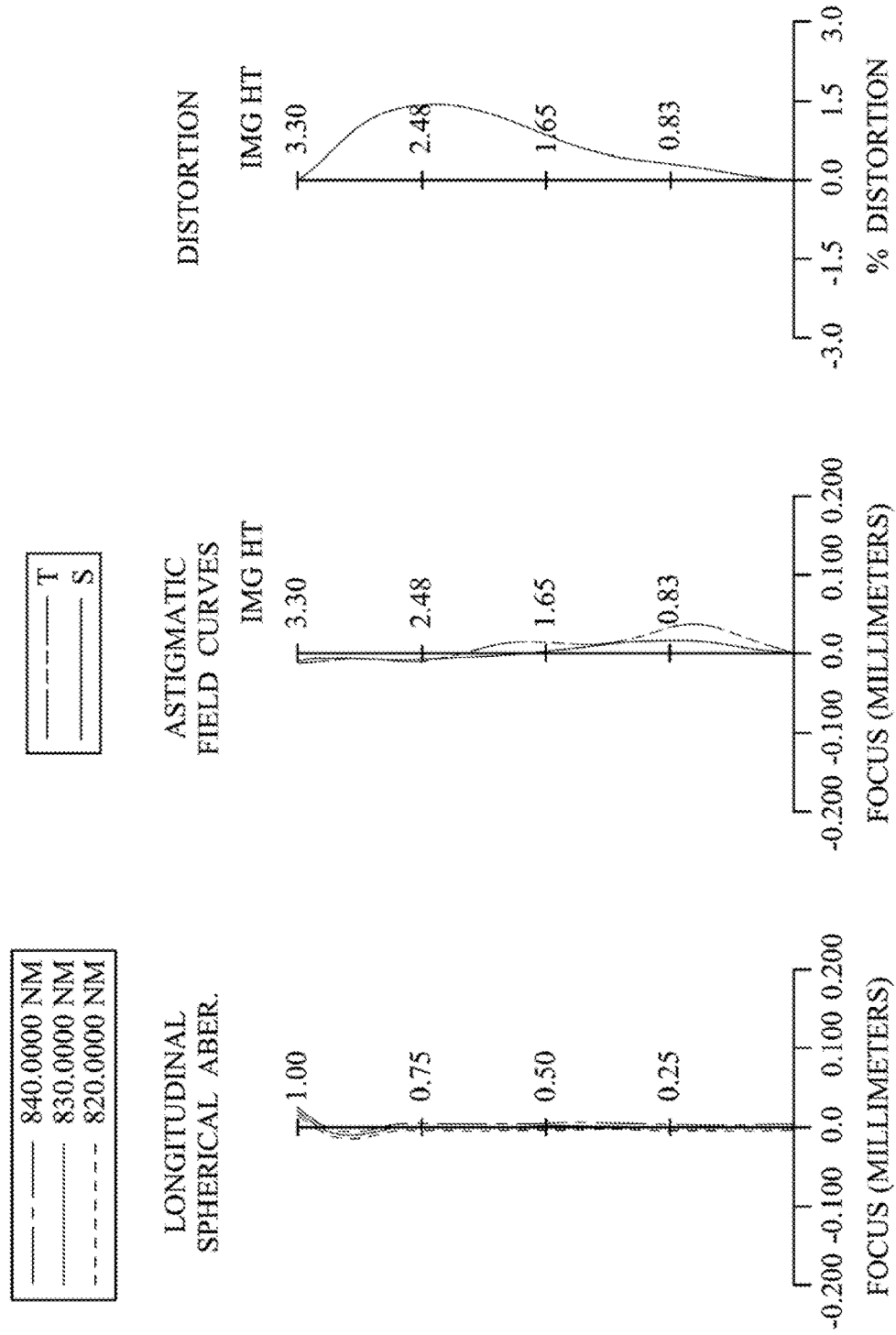
FIG. 4 shows spherical aberration curves, astigmatic field curves and a distortion curve of the lens assembly according to the 2nd embodiment.

FIG. 4 shows, in order from left to right, spherical aberration curves, astigmatic field curves and a distortion curve of the lens assembly 200 according to the 2nd embodiment. In FIG. 3, the lens assembly 200 includes, in order from an object side to an image side, a first lens element 210, an aperture stop 203, a second lens element 220, a third lens element 230, a fourth lens element 240, a glass panel 270 and an image surface 280, wherein the fourth lens element 240 of the lens assembly 200 is the last lens element according to the 2nd embodiment. The lens assembly 200 has a total of four lens elements (210-240).

The first lens element 210 with positive refractive power has an object-side surface 211 being convex in a paraxial region thereof and an image-side surface 212 being concave in a paraxial region thereof. The first lens element 210 is made of a plastic material, which is an electromagnetic radiation absorbing material made of a black dyed polycarbonate polymer. The first lens element 210 has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric. Furthermore, the image-side surface 242 of the fourth lens element 240 includes at least one convex shape in an off-axial region thereof.

The glass panel 270 is made of a glass material and located between the fourth lens element 240 and the image surface 280. The glass panel 270 can be cover glass, filter or both above, and will not affect the focal length of the lens assembly 200.

The detailed optical data of the 2nd embodiment are shown in TABLE 3 and the aspheric surface data are shown in TABLE 4 below.

TABLE 3

2nd Embodiment
f = 5.29 mm, Fno = 2.20, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.868 | ASP | 0.814 | Plastic | 1.569 | 30.2 | 4.93 |
| 2 | | 4.693 | ASP | 0.201 | | | | |
| 3 | Ape. Stop | Plano | | 0.718 | | | | |
| 4 | Lens 2 | −4.198 | ASP | 0.450 | Plastic | 1.638 | 20.4 | −42.43 |
| 5 | | −5.175 | ASP | 0.292 | | | | |
| 6 | Lens 3 | −2.053 | ASP | 0.858 | Plastic | 1.638 | 20.4 | 3.84 |
| 7 | | −1.299 | ASP | 0.719 | | | | |
| 8 | Lens 4 | −2.761 | ASP | 0.445 | Plastic | 1.528 | 55.8 | −3.65 |
| 9 | | 6.719 | ASP | 0.700 | | | | |
| 10 | Glass panel | Plano | | 0.400 | Glass | 1.510 | 64.2 | — |
| 11 | | Plano | | 0.659 | | | | |
| 12 | Image | Plano | | — | | | | |

Reference wavelength is 830 nm (d-line).
Lens 1 is made of an electromagnetic radiation absorbing material, which is a black dyed polycarbonate polymer.
Glass panel can be cover glass, filter or both above.

TABLE 4

Aspheric Coefficients

| Surface # | 1 | 2 | 4 | 5 |
|---|---|---|---|---|
| k = | −7.3891E−01 | −7.2087E+01 | 1.0334E+01 | −2.6464E+00 |
| A4 = | 1.6899E−02 | 8.1050E−02 | −8.6527E−02 | −8.1472E−02 |
| A6 = | 2.7046E−03 | −9.8188E−02 | 3.3786E−02 | 2.0949E−02 |
| A8 = | 1.0578E−03 | 8.9977E−02 | −1.0893E−01 | 1.6227E−02 |
| A10 = | −1.5051E−03 | −5.4113E−02 | 1.3072E−01 | −4.3577E−02 |
| A12 = | 1.9541E−03 | 1.2343E−02 | −4.5190E−02 | 4.2891E−02 |
| A14 = | −8.7880E−04 | | | −1.1321E−02 |

| Surface # | 6 | 7 | 8 | 9 |
|---|---|---|---|---|
| k = | 1.8525E−01 | −4.1809E+00 | −4.0568E+00 | 4.4934E+00 |
| A4 = | −1.6127E−02 | −1.1507E−01 | 1.3016E−01 | 1.5359E−02 |
| A6 = | 6.4768E−02 | 1.2222E−01 | −7.1639E−02 | −1.6427E−02 |
| A8 = | −5.9831E−03 | −7.4934E−02 | 2.2199E−02 | 4.4071E−03 |
| A10 = | −3.4749E−02 | 3.4251E−02 | −4.1194E−03 | −6.6584E−04 |
| A12 = | 2.4229E−02 | −1.1976E−02 | 4.0622E−04 | 5.1909E−05 |

TABLE 4-continued

| Aspheric Coefficients | | | | |
|---|---|---|---|---|
| A14 = | −4.6441E−03 | 2.5363E−03 | −1.5952E−05 | −1.9046E−06 |
| A16 = | | −2.2580E−04 | | 2.3792E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 5.29 | N | 4 |
| Fno | 2.20 | ImgH/BL | 1.88 |
| HFOV (deg.) | 32.0 | Nb | 1.569 |
| T_750 | 95.40% | TTL (mm) | 6.26 |
| T_700 | 0.22% | Vd_b | 30.20 |

3rd Embodiment

Figure 5:
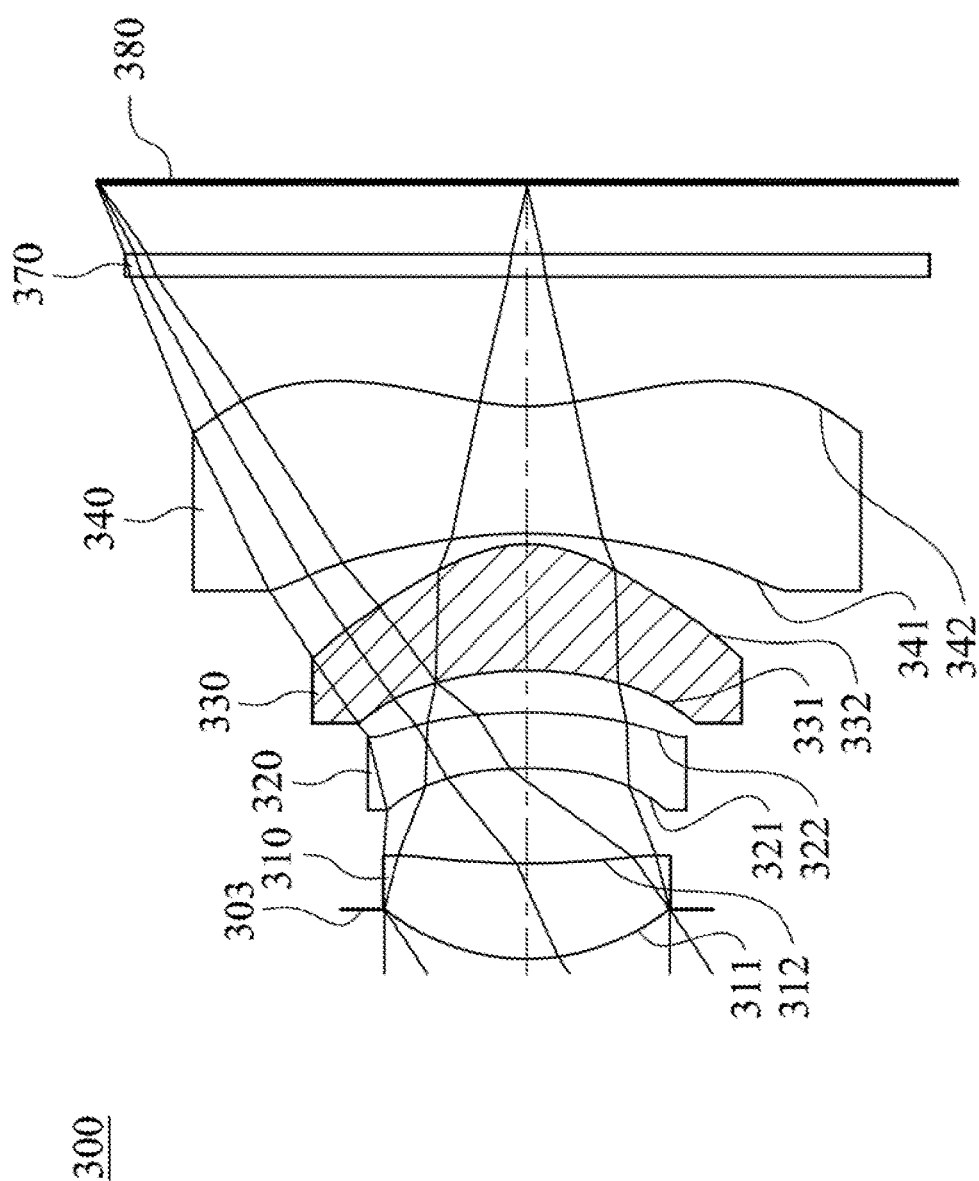
FIG. 5 is a schematic view of a lens assembly according to the 3rd embodiment of the present disclosure.
Figure 6:
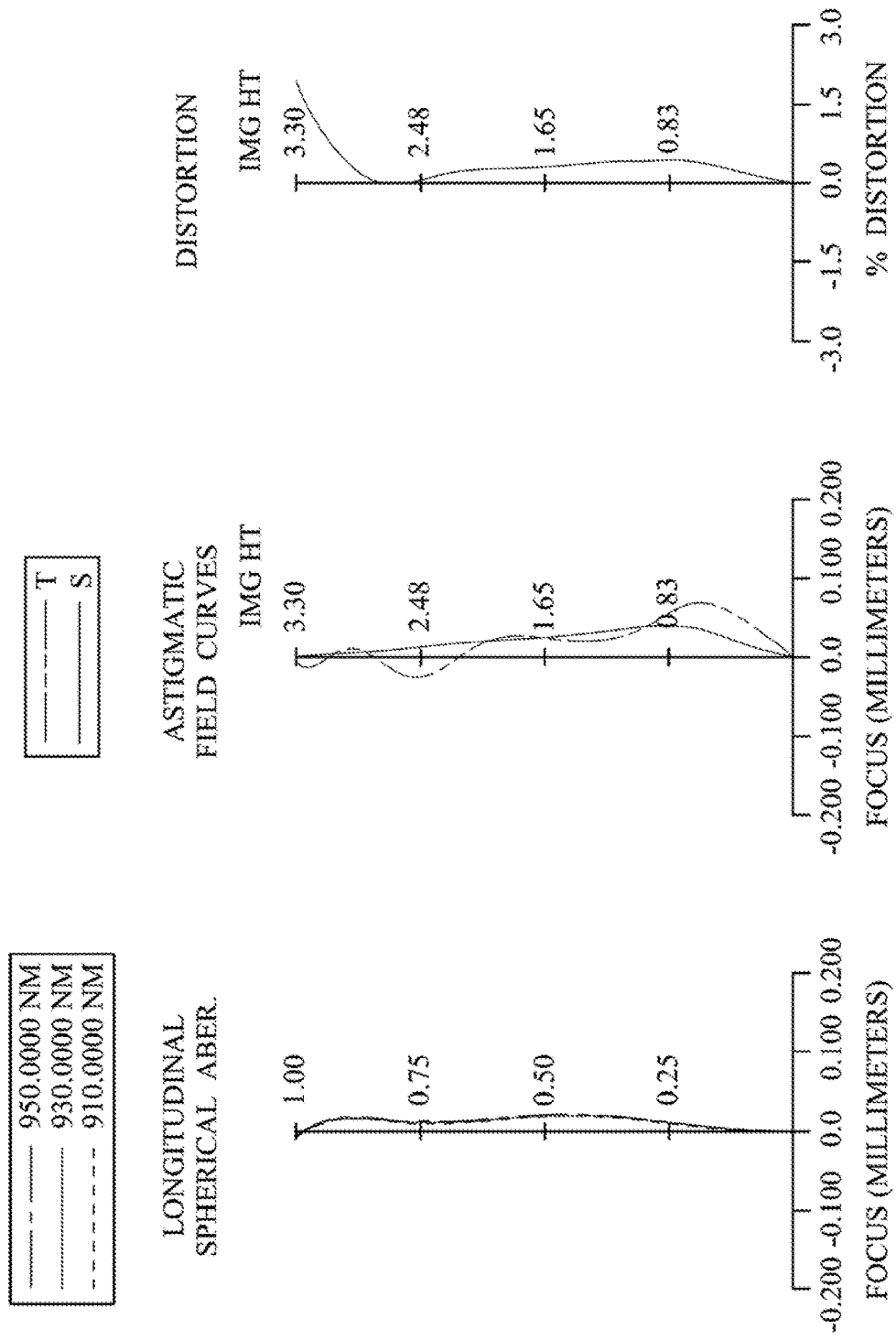
FIG. 6 shows spherical aberration curves, astigmatic field curves and a distortion curve of the lens assembly according to the 3rd embodiment.

FIG. 5 is a schematic view of a lens assembly 300 according to the 3rd embodiment of the present disclosure. FIG. 6 shows, in order from left to right, spherical aberration curves, astigmatic field curves and a distortion curve of the lens assembly 300 according to the 3rd embodiment. In FIG. 5, the lens assembly 300 includes, in order from an object side to an image side, an aperture stop 303, a first lens element 310, a second lens element 320, a third lens element 330, a fourth lens element 340, a glass panel 370 and an image surface 380, wherein the fourth lens element 340 of the lens assembly 300 is the last lens element according to the 3rd embodiment. The lens assembly 300 has a total of four lens elements (310-340).

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of a plastic material, which is an electromagnetic radiation absorbing material made of a black dyed polycarbonate polymer. The third lens element 330 has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one convex shape in an off-axial region thereof.

The glass panel 370 is made of a glass material and located between the fourth lens element 340 and the image surface 380. The glass panel 370 can be cover glass, filter or both above, and will not affect the focal length of the lens assembly 300.

The detailed optical data of the 3rd embodiment are shown in TABLE 5 and the aspheric surface data are shown in TABLE 6 below.

TABLE 5

3rd Embodiment
f = 4.94 mm, Fno = 2.25, HFOV = 33.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.387 | | | | |
| 2 | Lens 1 | 1.751 | ASP | 0.745 | Plastic | 1.535 | 55.9 | 4.23 |
| 3 | | 6.589 | ASP | 0.725 | | | | |
| 4 | Lens 2 | −2.982 | ASP | 0.432 | Plastic | 1.634 | 20.4 | −16.25 |
| 5 | | −4.433 | ASP | 0.323 | | | | |
| 6 | Lens 3 | −2.679 | ASP | 0.974 | Plastic | 1.567 | 30.2 | 2.38 |
| 7 | | −1.015 | ASP | 0.081 | | | | |
| 8 | Lens 4 | −3.666 | ASP | 0.978 | Plastic | 1.502 | 56.5 | −2.21 |
| 9 | | 1.737 | ASP | 1.000 | | | | |
| 10 | Glass panel | Plano | | 0.175 | Glass | 1.509 | 64.2 | — |
| 11 | | Plano | | 0.549 | | | | |
| 12 | Image | Plano | | — | | | | |

Reference wavelength is 930 nm (d-line).
Lens 3 is made of an electromagnetic radiation absorbing material, which is a black dyed polycarbonate polymer.
Glass panel can be cover glass, filter or both above.

TABLE 6

Aspheric Coefficients

| Surface # | 2 | 3 | 4 | 5 |
|---|---|---|---|---|
| k = | −6.8015E−01 | −4.3950E+00 | 3.3612E+00 | −9.0000E+01 |
| A4 = | 2.3664E−02 | −3.1298E−05 | −6.4709E−02 | −1.6932E−01 |
| A6 = | −8.9769E−03 | 1.1523E−03 | 6.1048E−02 | 2.4655E−01 |
| A8 = | 3.5729E−02 | −2.2589E−02 | −1.7787E−01 | −3.0622E−01 |
| A10 = | −4.8855E−02 | 1.9124E−02 | 1.6688E−01 | 2.1350E−01 |
| A12 = | 3.5124E−02 | −1.1649E−02 | −5.0134E−02 | −8.2031E−02 |
| A14 = | −1.0960E−02 |  |  | 1.8187E−02 |

| Surface # | 6 | 7 | 8 | 9 |
|---|---|---|---|---|
| k = | 2.7145E+00 | −4.2883E+00 | 1.9604E+00 | −1.2947E+01 |
| A4 = | −1.5440E−02 | −1.7617E−01 | 3.3600E−02 | −2.7765E−02 |
| A6 = | 3.4950E−02 | 2.0381E−01 | −3.3549E−03 | −2.0581E−03 |
| A8 = | 4.4681E−02 | −1.5636E−01 | −1.7894E−03 | 4.5118E−03 |
| A10 = | −8.5250E−02 | 9.2674E−02 | 2.0933E−04 | −1.9228E−03 |
| A12 = | 3.3390E−02 | −4.0572E−02 | 7.6603E−05 | 3.9125E−04 |
| A14 = | −8.2519E−04 | 1.0385E−02 | −1.5038E−06 | −3.9968E−05 |
| A16 = |  | −1.0922E−03 |  | 1.6570E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 4.94 | N | 4 |
| Fno | 2.25 | ImgH/BL | 192 |
| HFOV (deg.) | 33.2 | Nb | 1.567 |
| T_750 | 95.40% | TTL (mm) | 5.98 |
| T_700 | 0.22% | Vd_b | 30.20 |

4th Embodiment

Figure 7:
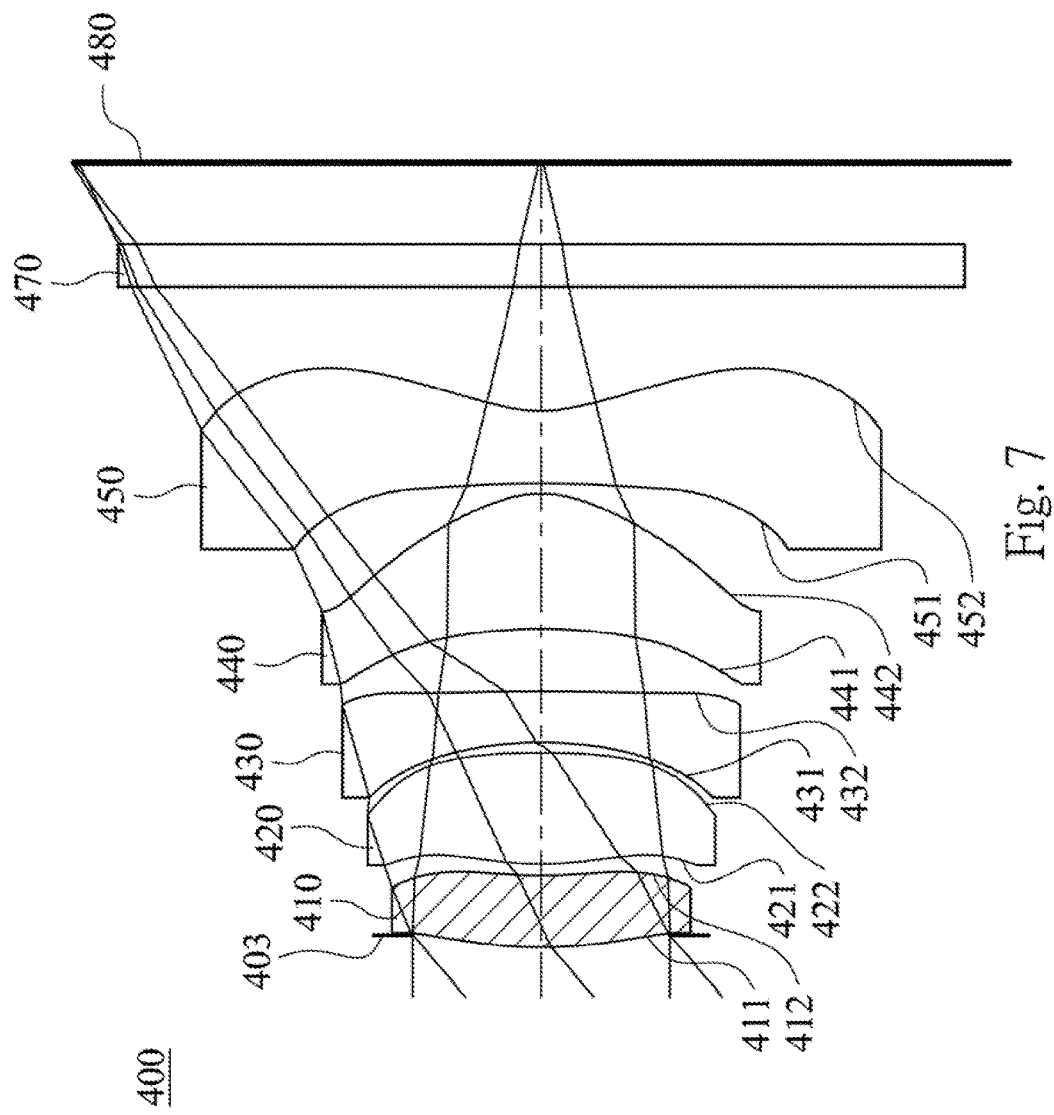
FIG. 7 is a schematic view of a lens assembly according to the 4th embodiment of the present disclosure.
Figure 8:
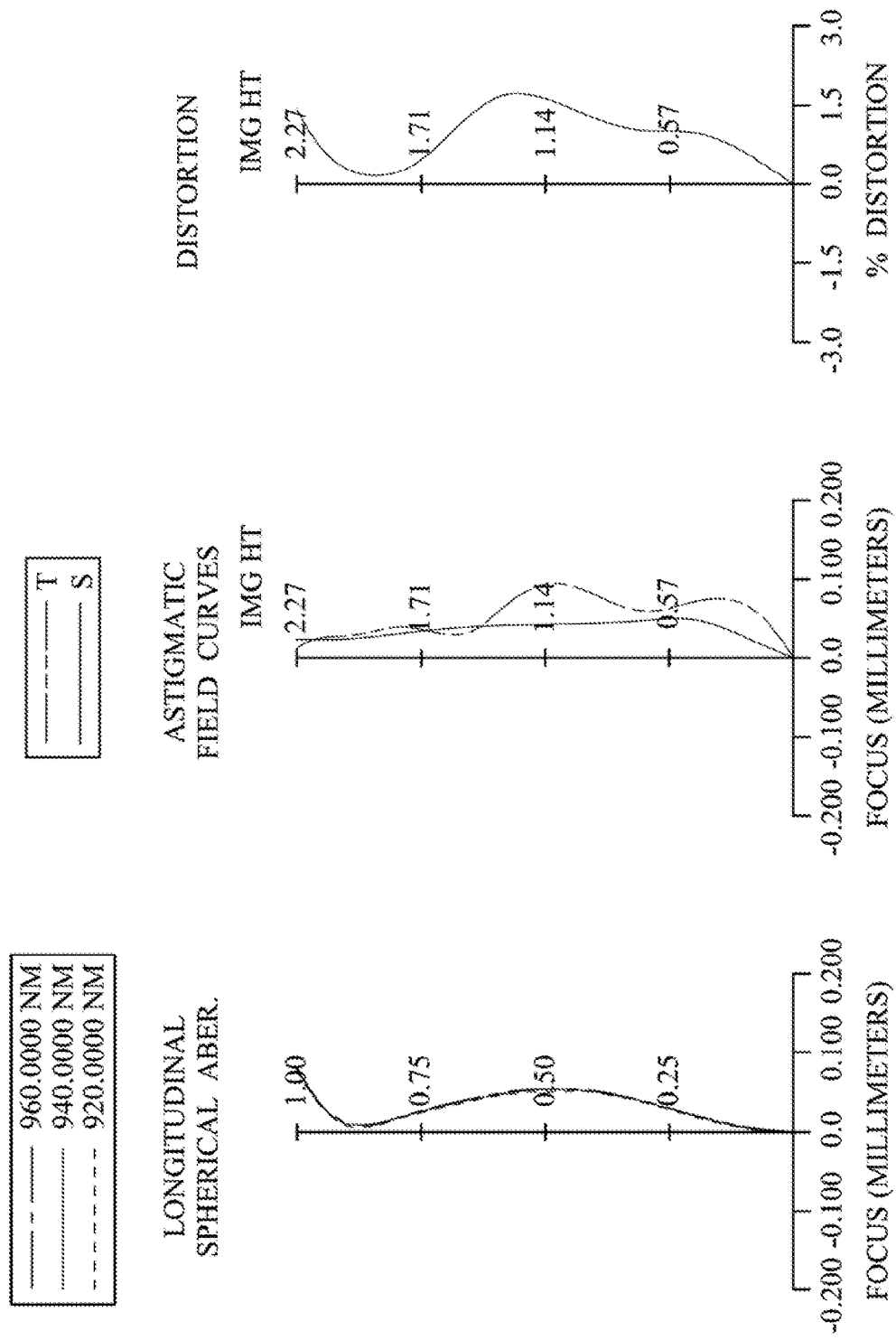
FIG. 8 shows spherical aberration curves, astigmatic field curves and a distortion curve of the lens assembly according to the 4th embodiment.

FIG. 7 is a schematic view of a lens assembly 400 according to the 4th embodiment of the present disclosure. FIG. 8 shows, in order from left to right, spherical aberration curves, astigmatic field curves and a distortion curve of the lens assembly 400 according to the 4th embodiment. In FIG. 7, the lens assembly 400 includes, in order from an object side to an image side, an aperture stop 403, a first lens element 410, a second lens element 420, a third lens element 430, a fourth lens element 440, a fifth lens element 450, a glass panel 470 and an image surface 480, wherein the fifth lens element 450 of the lens assembly 400 is the last lens element according to the 4th embodiment. The lens assembly 400 has a total of five lens elements (410-450).

The first lens element 410 with positive refractive power has an object-side surface 411 being convex in a paraxial region thereof and an image-side surface 412 being concave in a paraxial region thereof. The first lens element 410 is made of a plastic material, which is an electromagnetic radiation absorbing material made of a black dyed polycarbonate polymer. The first lens element 410 has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one convex shape in an off-axial region thereof.

The glass panel 470 is made of a glass material and located between the fifth lens element 450 and the image surface 480. The glass panel 470 can be cover glass, filter or both above, and will not affect the focal length of the lens assembly 400.

The detailed optical data of the 4th embodiment are shown in TABLE 7 and the aspheric surface data are shown in TABLE 8 below.

TABLE 7

4th Embodiment
f = 2.62 mm, Fno = 2.10, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.059 | | | | |
| 2 | Lens 1 | 2.145 | ASP | 0.350 | Plastic | 1.566 | 30.2 | 20.05 |
| 3 | | 2.488 | ASP | 0.052 | | | | |
| 4 | Lens 2 | 1.602 | ASP | 0.540 | Plastic | 1.535 | 55.9 | 2.23 |
| 5 | | −4.082 | ASP | 0.050 | | | | |
| 6 | Lens 3 | −2.073 | ASP | 0.250 | Plastic | 1.634 | 20.4 | −3.76 |
| 7 | | −16.648 | ASP | 0.301 | | | | |
| 8 | Lens 4 | −2.844 | ASP | 0.656 | Plastic | 1.634 | 20.4 | 0.90 |
| 9 | | −0.517 | ASP | 0.050 | | | | |
| 10 | Lens 5 | −4.084 | ASP | 0.350 | Plastic | 1.634 | 20.4 | −0.86 |
| 11 | | 0.649 | ASP | 0.600 | | | | |
| 12 | Glass panel | Plano | | 0.210 | Glass | 1.508 | 64.2 | — |
| 13 | | Plano | | 0.390 | | | | |
| 14 | Image | Plano | | — | | | | |

Reference wavelength is 940 nm (d-line).
Lens 1 is made of an electromagnetic radiation absorbing material, which is a black dyed polycarbonate polymer.
Glass panel can be cover glass, filter or both above.

TABLE 8

Aspheric Coefficients

| Surface # | 2 | 3 | 4 | 5 | 6 |
|---|---|---|---|---|---|
| k = | −1.9414E+00 | −9.3083E+00 | −9.8877E+00 | −4.9666E+01 | 2.4288E+00 |
| A4 = | −8.5151E−02 | −5.7236E−01 | −2.8569E−01 | −3.5211E−01 | −2.1979E−01 |
| A6 = | 1.4136E−01 | 1.7374E−01 | −1.5508E−01 | −8.6494E−02 | 3.6141E−01 |
| A8 = | −1.1954E+00 | −9.5315E−01 | −1.4912E+00 | −1.4312E−01 | 3.5162E−01 |
| A10 = | 2.4707E+00 | 1.6184E+00 | 2.9476E+00 | −3.7743E−01 | −2.1277E+00 |
| A12 = | −2.8733E+00 | −5.3888E−01 | −1.0320E+00 | 5.6513E−01 | 1.6155E+00 |

| Surface # | 7 | 8 | 9 | 10 | 11 |
|---|---|---|---|---|---|
| k = | 1.0000E+01 | 5.5234E+00 | −4.4636E+00 | 5.7857E+00 | −9.2412E+00 |
| A4 = | −2.0408E−02 | −2.2133E−01 | −5.8476E−01 | 2.6343E−01 | −3.3472E−02 |
| A6 = | 2.1386E−01 | 1.0267E+00 | 1.6874E+00 | −2.8908E−01 | −6.2260E−02 |
| A8 = | −1.4433E−01 | −2.6766E+00 | −2.8432E+00 | −2.4869E−01 | 3.1237E−02 |
| A10 = | −2.5172E−01 | 2.8226E+00 | 2.1029E+00 | 4.1155E−01 | −5.1285E−03 |
| A12 = | 1.3961E−01 | −9.8858E−01 | −5.0741E−01 | −1.4309E−01 | −1.0295E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 2.62 | N | 5 |
| Fno | 2.10 | ImgH/BL | 1.90 |
| HFOV (deg.) | 40.3 | Nb | 1.566 |
| T_750 | 95.40% | TTL (mm) | 3.80 |
| T_700 | 0.22% | Vd_b | 30.20 |

5th Embodiment

Figure 9:
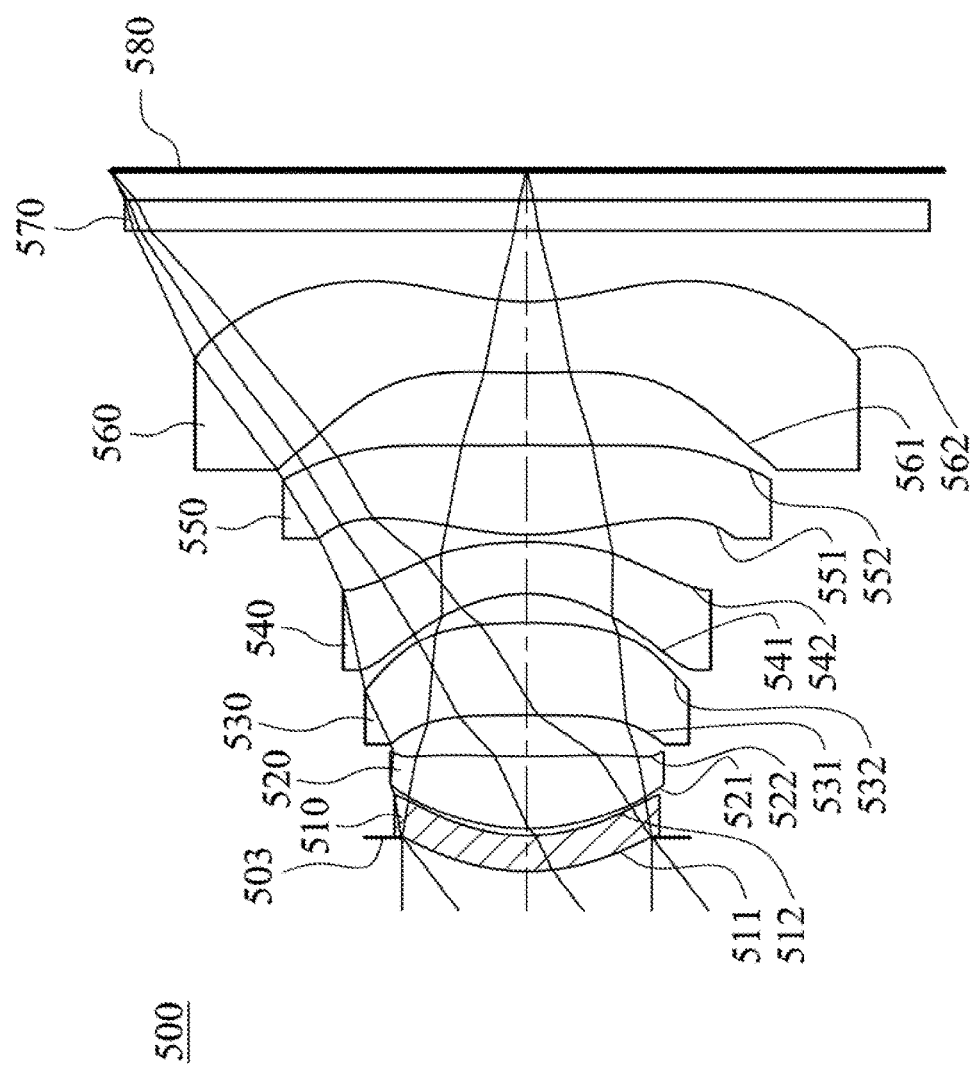
FIG. 9 is a schematic view of a lens assembly according to the 5th embodiment of the present disclosure.
Figure 10:
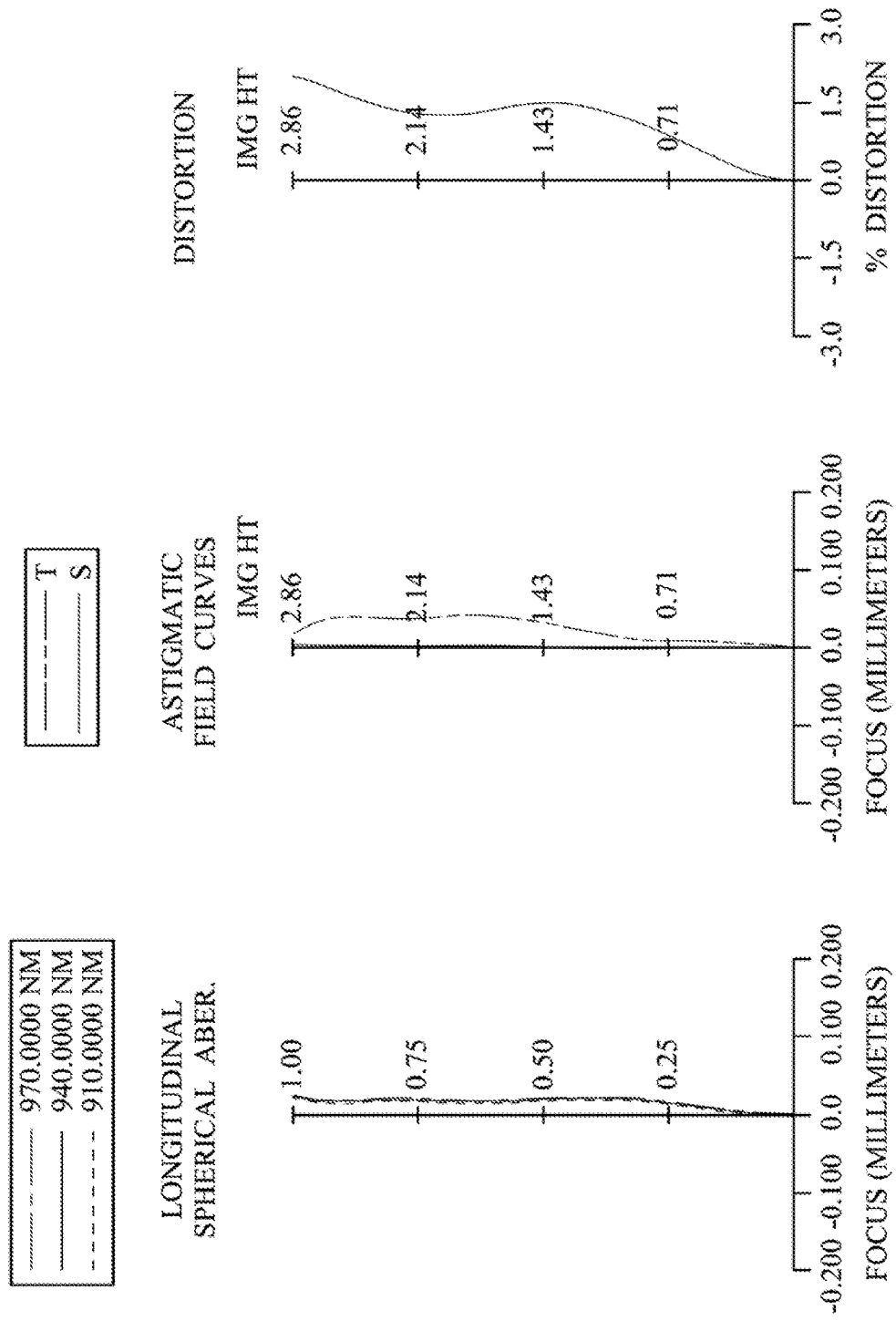
FIG. 10 shows spherical aberration curves, astigmatic field curves and a distortion curve of the lens assembly according to the 5th embodiment.

FIG. 9 is a schematic view of a lens assembly 500 according to the 5th embodiment of the present disclosure. FIG. 10 shows, in order from left to right, spherical aberration curves, astigmatic field curves and a distortion curve of the lens assembly 500 according to the 5th embodiment. In FIG. 9, the lens assembly 500 includes, in order from an object side to an image side, an aperture stop 503, a first lens element 510, a second lens element 520, a third lens element 530, a fourth lens element 540, a fifth lens element 550, a sixth lens element 560, a glass panel 570 and an image surface 580, wherein the sixth lens element 560 of the lens assembly 500 is the last lens element according to the 5th embodiment. The lens assembly 500 has a total of six lens elements (510-560).

The first lens element 510 with negative refractive power has an object-side surface 511 being convex in a paraxial region thereof and an image-side surface 512 being concave in a paraxial region thereof. The first lens element 510 is made of a plastic material, which is an electromagnetic radiation absorbing material made of a black dyed polycarbonate polymer. The first lens element 510 has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The glass panel 570 is made of a glass material and located between the sixth lens element 560 and the image surface 580. The glass panel 570 can be cover glass, filter or both above, and will not affect the focal length of the lens assembly 500.

The detailed optical data of the 5th embodiment are shown in TABLE 9 and the aspheric surface data are shown in TABLE 10 below.

TABLE 9

5th Embodiment
f = 3.59 mm, Fno = 2.10, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.234 | | | | |
| 2 | Lens 1 | 1.483 | ASP | 0.250 | Plastic | 1.566 | 30.2 | −13.78 |
| 3 | | 1.170 | ASP | 0.050 | | | | |
| 4 | Lens 2 | 1.352 | ASP | 0.495 | Plastic | 1.536 | 56.1 | 2.87 |
| 5 | | 9.745 | ASP | 0.282 | | | | |
| 6 | Lens 3 | −16.605 | ASP | 0.629 | Plastic | 1.536 | 56.1 | 9.08 |
| 7 | | −3.813 | ASP | 0.198 | | | | |
| 8 | Lens 4 | −1.030 | ASP | 0.354 | Plastic | 1.634 | 20.4 | −2.88 |
| 9 | | −2.674 | ASP | 0.050 | | | | |
| 10 | Lens 5 | 1.765 | ASP | 0.615 | Plastic | 1.634 | 20.4 | 2.56 |
| 11 | | −17.351 | ASP | 0.495 | | | | |
| 12 | Lens 6 | 8.584 | ASP | 0.482 | Plastic | 1.584 | 28.5 | −3.53 |
| 13 | | 1.630 | ASP | 0.492 | | | | |
| 14 | Glass panel | Plano | | 0.210 | Glass | 1.508 | 64.2 | — |
| 15 | | Plano | | 0.198 | | | | |
| 16 | Image | Plano | | — | | | | |

Reference wavelength is 940 nm (d-line).
Lens 1 is made of an electromagnetic radiation absorbing material, which is a black dyed polycarbonate polymer.
Glass panel can be cover glass, filter or both above.

TABLE 10

Aspheric Coefficients

| | Surface # | | | | | |
|---|---|---|---|---|---|---|
| | 2 | 3 | 4 | 5 | 6 | 7 |
| k = | 7.4286E−01 | −3.0163E+00 | −1.4303E+00 | 2.5551E+01 | 0.0000E+00 | 6.8939E−01 |
| A4 = | −1.1995E−01 | −1.4732E−01 | −2.3673E−01 | −8.4418E−02 | −1.5607E−01 | −1.5010E−01 |
| A6 = | 2.0237E−01 | 7.9815E−01 | 6.7309E−01 | −1.1305E−01 | −8.6954E−02 | −4.7236E−02 |
| A8 = | −4.4043E−01 | −1.6839E+00 | −1.2528E+00 | 2.5971E−01 | 1.8492E−02 | −1.3634E−01 |
| A10 = | 4.1968E−01 | 1.9935E+00 | 1.4204E+00 | −1.8064E−01 | −4.9949E−02 | 1.6475E−01 |
| A12 = | −2.3376E−01 | −1.0599E+00 | −5.9898E−01 | −3.2046E−01 | −7.8841E−02 | −5.2127E−02 |
| A14 = | | | | 5.7104E−01 | 1.3066E−01 | 1.1013E−02 |

TABLE 10-continued

Aspheric Coefficients

| Surface # | | | | | |
|---|---|---|---|---|---|
| 8 | 9 | 10 | 11 | 12 | 13 |
| k = −4.5080E+00 | 1.3404E−01 | −1.3391E+01 | −2.0000E+01 | −9.8487E+00 | −7.8771E−01 |
| A4 = −2.2875E−01 | −2.5906E−01 | −5.8644E−02 | 1.6361E−01 | −1.9881E−01 | −2.6539E−01 |
| A6 = −2.0282E−02 | 2.6912E−01 | −1.4529E−02 | −3.2934E−01 | 1.1342E−02 | 1.3289E−01 |
| A8 = 4.1416E−01 | −1.8711E−02 | 3.0441E−02 | 3.0225E−01 | 2.1691E−02 | −5.7800E−02 |
| A10 = −7.0335E−01 | −1.1065E−01 | −2.7250E−02 | −1.7372E−01 | −8.9349E−03 | 1.7701E−02 |
| A12 = 5.4232E−01 | 6.5826E−02 | 8.9939E−03 | 6.0584E−02 | 2.4880E−03 | −3.4036E−03 |
| A14 = −1.4342E−01 | −9.9187E−03 | −1.1182E−03 | −1.1420E−02 | −2.6153E−04 | 3.6421E−04 |
| A16 = | | | 8.7742E−04 | −3.0400E−05 | −1.6662E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 3.59 | N | 6 |
| Fno | 2.10 | ImgH/BL | 3.17 |
| HFOV (deg.) | 37.8 | Nb | 1.566 |
| T_750 | 95.40% | TTL (mm) | 4.80 |
| T_700 | 0.22% | Vd_b | 30.20 |

6th Embodiment

Figure 11:
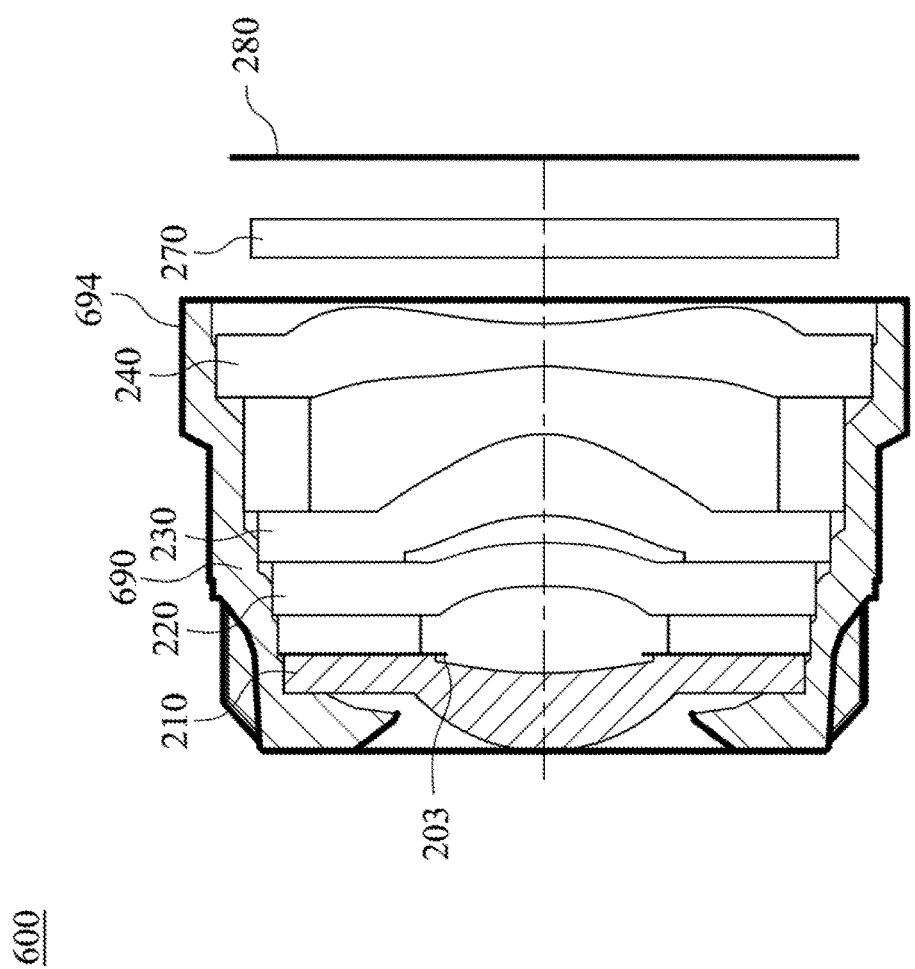
FIG. 11 is a schematic view of a lens assembly according to the 6th embodiment of the present disclosure.

FIG. 11 is a schematic view of a lens assembly 600 according to the 6th embodiment of the present disclosure. The lens assembly 600 includes the lens assembly 200 in the aforementioned 2nd embodiment and a housing 690, wherein the first lens element 210, the aperture stop 203, the second lens element 220, the third lens element 230 and the fourth lens element 240 of the lens assembly 200 are inside the housing 690. The housing 690 is made of a black dyed plastic material and includes an anti-VIS coating 694 and matte surfaces (its reference numeral is omitted).

Furthermore, the lens assembly 600 includes an electromagnetic radiation shield, which is the aperture stop 203.

Figure 12:
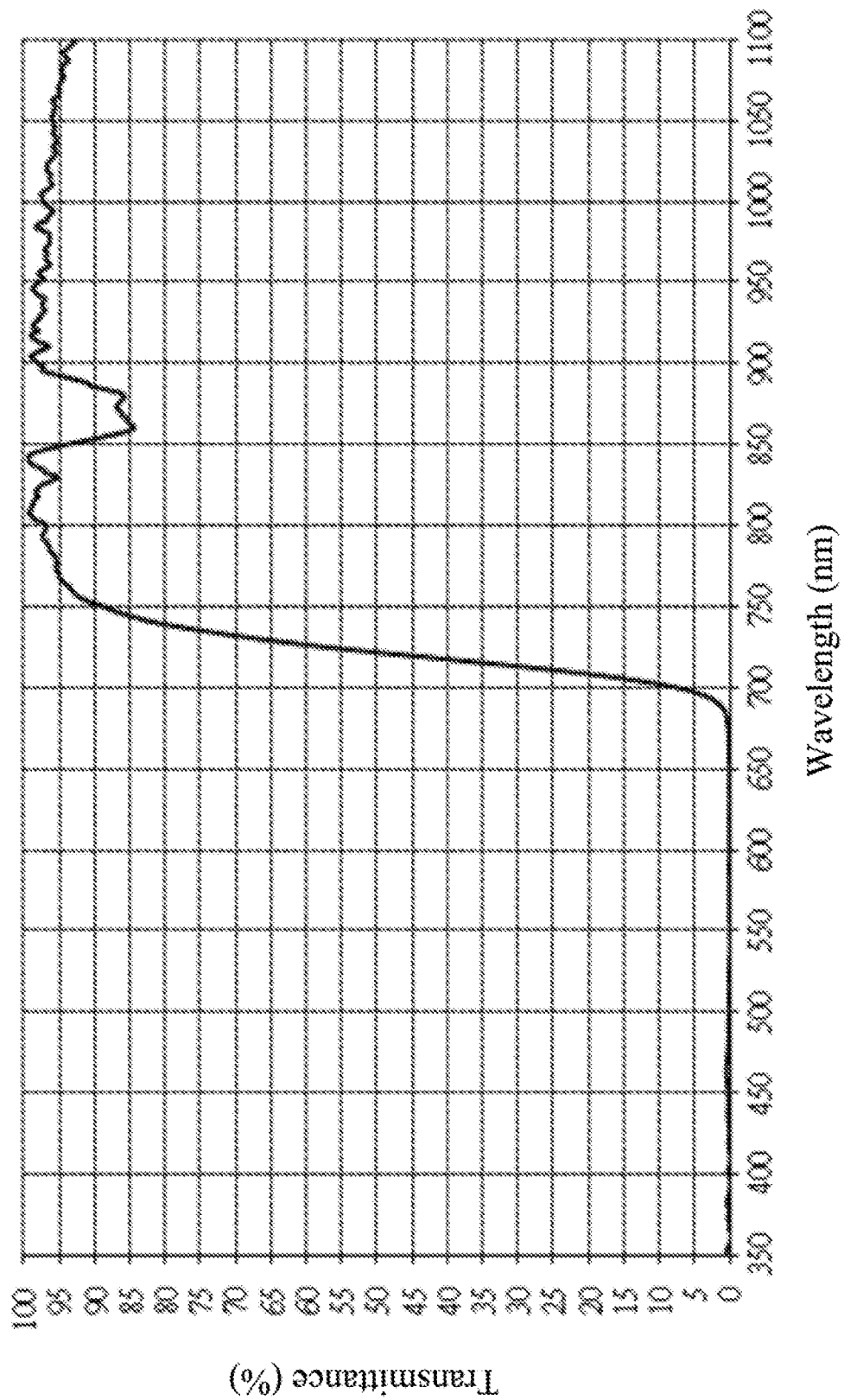
FIG. 12 is a graph of the transmittance of the electromagnetic radiation absorbing material according to TABLE 11.

In addition, TABLE 11 below is a data list of the transmittance of the electromagnetic radiation absorbing material of the first lens element 210 according to the 6th embodiment, and FIG. 12 is a graph of the transmittance of the electromagnetic radiation absorbing material according to TABLE 11. From TABLE 11, the parameters T_750 and T_700 can be calculated to be 95.40% and 0.22% respectively as the aforementioned 2nd embodiment shows.

TABLE 11

| Wavelength (nm) | Transmittance (%) |
|---|---|
| 1200 | 88.434 |
| 1198 | 88.128 |
| 1196 | 87.954 |
| 1194 | 87.818 |
| 1192 | 87.541 |

TABLE 11-continued

| Wavelength (nm) | Transmittance (%) |
|---|---|
| 1190 | 87.257 |
| 1188 | 86.953 |
| 1186 | 86.997 |
| 1184 | 86.877 |
| 1182 | 86.785 |
| 1180 | 86.426 |
| 1178 | 86.22 |
| 1176 | 86.156 |
| 1174 | 86.465 |
| 1172 | 86.831 |
| 1170 | 87.01 |
| 1168 | 87.492 |
| 1166 | 87.945 |
| 1164 | 88.421 |
| 1162 | 88.381 |
| 1160 | 88.305 |
| 1158 | 89.025 |
| 1156 | 89.04 |
| 1154 | 89.259 |
| 1152 | 89.011 |
| 1150 | 88.856 |
| 1148 | 88.322 |
| 1146 | 88.244 |
| 1144 | 88.102 |
| 1142 | 87.889 |
| 1140 | 87.915 |
| 1138 | 87.546 |
| 1136 | 87.171 |
| 1134 | 86.146 |
| 1132 | 85.806 |
| 1130 | 86.205 |
| 1128 | 86.464 |
| 1126 | 87.208 |
| 1124 | 87.782 |
| 1122 | 87.891 |
| 1120 | 88.568 |
| 1118 | 88.997 |
| 1116 | 89.83 |
| 1114 | 80.394 |
| 1112 | 91.518 |
| 1110 | 91.934 |
| 1108 | 92.07 |
| 1106 | 91.766 |
| 1104 | 91.8 |
| 1102 | 92.218 |
| 1100 | 92.555 |
| 1098 | 92.982 |
| 1096 | 93.511 |
| 1094 | 93.766 |
| 1092 | 94.487 |
| 1090 | 94.241 |
| 1088 | 94.021 |
| 1086 | 93.76 |
| 1084 | 94.47 |
| 1082 | 94.573 |
| 1080 | 94.716 |
| 1078 | 94.542 |
| 1076 | 94.347 |

TABLE 11-continued

| Wavelength (nm) | Transmittance (%) |
|---|---|
| 1074 | 94.743 |
| 1072 | 94.889 |
| 1070 | 95.197 |
| 1068 | 94.971 |
| 1066 | 94.984 |
| 1064 | 95.333 |
| 1062 | 96.017 |
| 1060 | 95.644 |
| 1058 | 95.513 |
| 1056 | 95.774 |
| 1054 | 95.8 |
| 1052 | 96.067 |
| 1050 | 96.017 |
| 1048 | 95.839 |
| 1046 | 95.756 |
| 1044 | 95.725 |
| 1042 | 95.9 |
| 1040 | 95.649 |
| 1038 | 95.499 |
| 1036 | 95.404 |
| 1034 | 95.865 |
| 1032 | 95.783 |
| 1030 | 95.434 |
| 1028 | 95.719 |
| 1026 | 96.106 |
| 1024 | 96.546 |
| 1022 | 96.662 |
| 1020 | 96.787 |
| 1018 | 96.783 |
| 1016 | 96.209 |
| 1014 | 96.376 |
| 1012 | 96.291 |
| 1010 | 96.076 |
| 1008 | 96.323 |
| 1006 | 97.058 |
| 1004 | 97.611 |
| 1002 | 97.471 |
| 1000 | 97.471 |
| 998 | 97.135 |
| 996 | 96.356 |
| 994 | 95.852 |
| 992 | 96.264 |
| 990 | 96.677 |
| 988 | 96.826 |
| 986 | 97.972 |
| 984 | 98.318 |
| 982 | 97.435 |
| 980 | 96.506 |
| 978 | 96.382 |
| 976 | 96.407 |
| 974 | 96.348 |
| 972 | 96.73 |
| 970 | 97.091 |
| 968 | 96.778 |
| 966 | 96.943 |
| 964 | 96.891 |
| 962 | 96.56 |
| 960 | 96.364 |
| 958 | 97.292 |
| 956 | 97.864 |
| 954 | 97.826 |
| 952 | 97.22 |
| 950 | 97.81 |
| 948 | 98.401 |
| 946 | 98.796 |
| 944 | 98.472 |
| 942 | 98.065 |
| 940 | 97.17 |
| 938 | 97.194 |
| 936 | 97.451 |
| 934 | 97.309 |
| 932 | 97.057 |
| 930 | 97.54 |
| 928 | 97.775 |
| 926 | 98.187 |
| 924 | 98.623 |
| 922 | 98.693 |
| 920 | 97.988 |

TABLE 11-continued

| Wavelength (nm) | Transmittance (%) |
|---|---|
| 918 | 98.927 |
| 916 | 98.973 |
| 914 | 98.421 |
| 912 | 97.257 |
| 910 | 96.471 |
| 908 | 97.573 |
| 906 | 98.365 |
| 904 | 99.063 |
| 902 | 98.66 |
| 900 | 98.129 |
| 898 | 97.219 |
| 896 | 97.593 |
| 894 | 96.682 |
| 892 | 94.642 |
| 890 | 93.019 |
| 888 | 91.197 |
| 886 | 90.562 |
| 884 | 88.852 |
| 882 | 86.867 |
| 880 | 85.812 |
| 878 | 85.996 |
| 876 | 86.503 |
| 874 | 86.82 |
| 872 | 86.943 |
| 870 | 86.381 |
| 868 | 86.209 |
| 866 | 85.527 |
| 864 | 85.353 |
| 862 | 84.757 |
| 860 | 84.451 |
| 858 | 85.33 |
| 856 | 87.056 |
| 854 | 89.272 |
| 852 | 91.35 |
| 850 | 93.705 |
| 848 | 95.638 |
| 846 | 97.32 |
| 844 | 98.801 |
| 842 | 99.405 |
| 840 | 99.429 |
| 838 | 99.075 |
| 836 | 98.326 |
| 834 | 97.2 |
| 832 | 96.952 |
| 830 | 95.472 |
| 828 | 95.705 |
| 826 | 96.711 |
| 824 | 97.732 |
| 822 | 98.062 |
| 820 | 98.405 |
| 818 | 97.937 |
| 816 | 98.518 |
| 814 | 98.637 |
| 812 | 98.837 |
| 810 | 98.978 |
| 808 | 99.366 |
| 806 | 98.855 |
| 804 | 98.76 |
| 802 | 97.547 |
| 800 | 96.876 |
| 798 | 96.954 |
| 796 | 97.14 |
| 794 | 97.362 |
| 792 | 97.326 |
| 790 | 96.752 |
| 788 | 96.635 |
| 786 | 96.385 |
| 784 | 96.347 |
| 782 | 95.696 |
| 780 | 95.669 |
| 778 | 95.347 |
| 776 | 95.451 |
| 774 | 95.496 |
| 772 | 95.411 |
| 770 | 95.105 |
| 768 | 94.973 |
| 766 | 94.706 |
| 764 | 94.303 |

TABLE 11-continued

| Wavelength (nm) | Transmittance (%) |
|---|---|
| 762 | 93.551 |
| 760 | 93.369 |
| 758 | 92.962 |
| 756 | 92.585 |
| 754 | 91.645 |
| 752 | 90.499 |
| 750 | 89.039 |
| 748 | 87.774 |
| 746 | 86.506 |
| 744 | 85.084 |
| 742 | 83.406 |
| 740 | 81.596 |
| 738 | 79.196 |
| 736 | 76.532 |
| 734 | 73.472 |
| 732 | 70.545 |
| 730 | 67.196 |
| 728 | 63.672 |
| 726 | 59.865 |
| 724 | 55.761 |
| 722 | 51.316 |
| 720 | 46.71 |
| 718 | 41.838 |
| 716 | 37.045 |
| 714 | 32.433 |
| 712 | 27.94 |
| 710 | 23.814 |
| 708 | 19.926 |
| 706 | 16.391 |
| 704 | 13.182 |
| 702 | 10.363 |
| 700 | 7.981 |
| 698 | 6.046 |
| 696 | 4.462 |
| 694 | 3.259 |
| 692 | 2.313 |
| 690 | 1.61 |
| 688 | 1.155 |
| 686 | 0.831 |
| 684 | 0.596 |
| 682 | 0.447 |
| 680 | 0.404 |
| 678 | 0.276 |
| 676 | 0.199 |
| 674 | 0.169 |
| 672 | 0.119 |
| 670 | 0.081 |
| 668 | 0.102 |
| 666 | 0.106 |
| 664 | 0.08 |
| 662 | 0.081 |
| 660 | 0.036 |
| 658 | 0.027 |
| 656 | 0.029 |
| 654 | 0.019 |
| 652 | 0.001 |
| 650 | −0.026 |
| 648 | 0.002 |
| 646 | 0.021 |
| 644 | −0.004 |
| 642 | −0.007 |
| 640 | 0.032 |
| 638 | 0.024 |
| 636 | 0.004 |
| 634 | 0.007 |
| 632 | −0.019 |
| 630 | −0.059 |
| 628 | −0.047 |
| 626 | −0.032 |
| 624 | 0.002 |
| 622 | −0.013 |
| 620 | 0.006 |
| 618 | 0.034 |
| 616 | −0.009 |
| 614 | −0.021 |
| 612 | −0.028 |
| 610 | −0.056 |
| 608 | −0.069 |

TABLE 11-continued

| Wavelength (nm) | Transmittance (%) |
|---|---|
| 606 | −0.05 |
| 604 | −0.007 |
| 602 | −0.032 |
| 600 | −0.01 |
| 598 | −0.02 |
| 596 | 0.003 |
| 594 | −0.008 |
| 592 | 0.008 |
| 590 | 0.035 |
| 588 | 0.031 |
| 586 | 0.009 |
| 584 | 0.007 |
| 582 | −0.012 |
| 580 | −0.011 |
| 578 | −0.036 |
| 576 | −0.015 |
| 574 | −0.05 |
| 572 | −0.038 |
| 570 | −0.014 |
| 568 | −0.029 |
| 566 | −0.044 |
| 564 | −0.054 |
| 562 | −0.033 |
| 560 | −0.043 |
| 558 | −0.068 |
| 556 | −0.067 |
| 554 | −0.073 |
| 552 | −0.081 |
| 550 | −0.079 |
| 548 | −0.049 |
| 546 | −0.067 |
| 544 | −0.1 |
| 542 | −0.075 |
| 540 | −0.09 |
| 538 | −0.086 |
| 536 | −0.087 |
| 534 | −0.069 |
| 532 | −0.06 |
| 530 | −0.029 |
| 528 | 0.023 |
| 526 | 0.052 |
| 524 | 0.036 |
| 522 | 0.022 |
| 520 | 0.019 |
| 518 | 0.021 |
| 516 | −0.003 |
| 514 | 0.007 |
| 512 | 0.029 |
| 510 | 0.047 |
| 508 | 0.063 |
| 506 | 0.053 |
| 504 | 0.051 |
| 502 | 0.021 |
| 500 | 0.02 |
| 498 | 0.076 |
| 496 | 0.112 |
| 494 | 0.12 |
| 492 | 0.116 |
| 490 | 0.124 |
| 488 | 0.116 |
| 486 | 0.084 |
| 484 | 0.094 |
| 482 | 0.106 |
| 480 | 0.132 |
| 478 | 0.154 |
| 476 | 0.24 |
| 474 | 0.269 |
| 472 | 0.326 |
| 470 | 0.375 |
| 468 | 0.432 |
| 466 | 0.474 |
| 464 | 0.5 |
| 462 | 0.49 |
| 460 | 0.452 |
| 458 | 0.371 |
| 456 | 0.348 |
| 454 | 0.297 |
| 452 | 0.246 |

TABLE 11-continued

| Wavelength (nm) | Transmittance (%) |
| --- | --- |
| 450 | 0.187 |
| 448 | 0.198 |
| 446 | 0.169 |
| 444 | 0.175 |
| 442 | 0.158 |
| 440 | 0.171 |
| 438 | 0.178 |
| 436 | 0.207 |
| 434 | 0.171 |
| 432 | 0.16 |
| 430 | 0.059 |
| 428 | 0.062 |
| 426 | −0.016 |
| 424 | 0.029 |
| 422 | 0.093 |
| 420 | 0.129 |
| 418 | 0.159 |
| 416 | 0.035 |
| 414 | 0.04 |
| 412 | −0.071 |
| 410 | −0.149 |
| 408 | −0.124 |
| 406 | −0.079 |
| 404 | 0.08 |
| 402 | 0.212 |
| 400 | 0.214 |
| 398 | −0.043 |
| 396 | −0.11 |
| 394 | −0.1 |
| 392 | −0.137 |
| 390 | −0.044 |
| 388 | −0.046 |
| 386 | 0.114 |
| 384 | 0.276 |
| 382 | 0.288 |
| 380 | 0.282 |
| 378 | 0.156 |
| 376 | 0.073 |
| 374 | 0.18 |
| 372 | 0.262 |
| 370 | 0.027 |
| 368 | −0.079 |
| 366 | 0.082 |
| 364 | −0.166 |
| 362 | −0.217 |
| 360 | −0.197 |
| 358 | −0.125 |
| 356 | 0.118 |
| 354 | 0.295 |
| 352 | 0.494 |
| 350 | 0.553 |

The foregoing description, for purpose of explanation, has been described with reference to specific embodiments. It is to be noted that TABLES 1-11 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens assembly, comprising:
at least five lens elements, wherein one lens element closest to an imaged object of the lens elements is a first lens element, which is made of an electromagnetic radiation absorbing material and has an image-side surface being concave in a paraxial region thereof;
wherein an average transmittance of the electromagnetic radiation absorbing material for electromagnetic radiation with wavelengths in a range of 750 nm to 1100 nm is T_750, an average transmittance of the electromagnetic radiation absorbing material for electromagnetic radiation with wavelengths in a range of 350 nm to 700 nm is T_700, an f-number of the lens assembly is Fno, and the following conditions are satisfied:

50%<T_750;

T_700<20%; and 1.40<Fno≤2.25.

2. The lens assembly of claim 1, wherein one lens element closest to an image surface of the lens elements is a last lens element, which has an image-side surface being concave in a paraxial region thereof, and the image-side surface of the last lens element comprises at least one convex shape in an off-axial region thereof.

3. The lens assembly of claim 1, wherein the electromagnetic radiation absorbing material is made of a black dyed polycarbonate polymer.

4. The lens assembly of claim 1, further comprising:
a housing made of a black dyed plastic material.

5. The lens assembly of claim 1, wherein the average transmittance of the electromagnetic radiation absorbing material for electromagnetic radiation with wavelengths in the range of 350 nm to 700 nm is T_700, and the following condition is satisfied:

T_700<10%.

6. The lens assembly of claim 1, wherein the average transmittance of the electromagnetic radiation absorbing material for electromagnetic radiation with wavelengths in the range of 750 nm to 1100 nm is T_750, and the following condition is satisfied:

70%<T_750.

7. The lens assembly of claim 1, wherein the first lens element has positive refractive power, and the lens elements are all made of plastic materials.

8. The lens assembly of claim 7, further comprising:
at least one electromagnetic radiation shield for blocking stray electromagnetic radiation.

9. The lens assembly of claim 1, wherein a number of the lens elements of the lens assembly is N, and the following condition is satisfied:

5≤N≤7.

10. The lens assembly of claim 1, wherein an axial distance between an object-side surface of the first lens element and an image surface is TTL, a focal length of the lens assembly is f, and the following conditions are satisfied:

1.0 mm<TTL<8.0 mm; and 0 mm<f<7.0 mm.

11. The lens assembly of claim 1, wherein one lens element closest to an image surface of the lens elements is a last lens element, a maximum image height of the lens assembly is ImgH, an axial distance between an image-side surface of the last lens element and the image surface is BL, and the following condition is satisfied:

1.0<ImgH/BL<6.0.

12. A lens assembly, comprising:
at least five lens elements, wherein one lens element closest to an imaged object of the lens elements is a first lens element, which has an image-side surface being concave in a paraxial region thereof, one lens element closest to an image surface of the lens elements is a last lens element, which has an image-side surface being concave in a paraxial region thereof, the image-side surface of the last lens element is aspheric and comprises at least one convex shape in an off-axial region thereof, and at least one of the lens elements is made of an electromagnetic radiation absorbing material;
wherein an average transmittance of the electromagnetic radiation absorbing material for electromagnetic radiation with wavelengths in a range of 750 nm to 1100 nm is $T\_750$, an average transmittance of the electromagnetic radiation absorbing material for electromagnetic radiation with wavelengths in a range of 350 nm to 700 nm is $T\_700$, an f-number of the lens assembly is Fno, and the following conditions are satisfied:

$50\% < T\_750$;

$T\_700 < 20\%$; and $1.40 < Fno < 2.25$.

13. The lens assembly of claim 12, wherein the last lens element has negative refractive power.

14. The lens assembly of claim 12, wherein an axial distance between an object-side surface of the first lens element and the image surface is TTL, a focal length of the lens assembly is f, and the following conditions are satisfied:

$1.0$ mm $< TTL < 8.0$ mm; and $0$ mm $< f < 7.0$ mm.

15. The lens assembly of claim 12, wherein a number of the lens elements of the lens assembly is N, and the following condition is satisfied:

$5 \leq N \leq 7$.

16. The lens assembly of claim 15, wherein the number of the lens elements of the lens assembly is N, and the following condition is satisfied:

$5 \leq N \leq 6$.

17. The lens assembly of claim 12, wherein the average transmittance of the electromagnetic radiation absorbing material for electromagnetic radiation with wavelengths in the range of 350 nm to 700 nm is $T\_700$, and the following condition is satisfied:

$T\_700 < 10\%$.

18. The lens assembly of claim 12, wherein the average transmittance of the electromagnetic radiation absorbing material for electromagnetic radiation with wavelengths in the range of 750 nm to 1100 nm is $T\_750$, and the following condition is satisfied:

$70\% < T\_750$.

19. The lens assembly of claim 12, wherein the first lens element has positive refractive power, and the lens elements are all made of plastic materials.

20. The lens assembly of claim 19, wherein the electromagnetic radiation absorbing material is made of a black dyed polycarbonate polymer.

* * * * *